United States Patent Office 3,524,905
Patented Aug. 18, 1970

3,524,905
**POLYPROPYLENE-HYDROLYZED ETHYLENE/
VINYL ESTER COPOLYMER BLENDS**
John S. Coates, Wilmington, Del., assignor to E. I. du
Pont de Nemours and Company, Wilmington, Del., a
corporation of Delaware
No Drawing. Filed Nov. 30, 1967, Ser. No. 686,845
Int. Cl. C08f 29/12, 37/18
U.S. Cl. 260—897                    16 Claims

ABSTRACT OF THE DISCLOSURE

Adhesive compositions, having superior peel strength, of isotactic polypropylene and hydrolyzed ethylene/vinyl ester (e.g., vinyl acetate) copolymers are disclosed. The hydrolyzed copolymer initially contains about 5–25 mole percent vinyl ester and is hydrolyzed to at least about 60 percent.

BACKGROUND OF THE INVENTION

As shown in U.S. Pat. 2,386,347, issued to John R. Roland on Oct. 9, 1945, hydrolyzed ethylene/vinyl ester polymers have been known for quite some time. In particular, these hydrolyzed copolymers have found applications as structural adhesives. In selecting the hydrolyzed copolymers as structural adhesives, consideration has been given to several known properties of the copolymers. Thus, for a hydrolyzed copolymer with a given ethylene content, the copolymer lap-shear strength increases as the degree of hydrolysis is increased, generally reaching a maximum at substantially complete hydrolysis, i.e., about 95 percent or greater. On the other hand, the hydrolyzed copolymer's peel strength attains its maximum value prior to complete hydrolysis; and, in fact, is usually extraordinarily low at substantially complete hydrolysis. Consequently, in adhesive applications where the combination of both high lap-shear strength and high peel strength is required, hydrolyzed ethylene/vinyl ester copolymers have found very limited use.

SUMMARY OF THE INVENTION

However, according to the present invention, there is provided a structural adhesive composition, based on a blend of a hydrolyzed ethylene/vinyl ester copolymer and isotactic polypropylene, which displays the unique combination of high lap-shear strength and high peel strength. The composition of the present invention consists essentially of (A) about 2–50 weight percent of an isotactic polypropylene and (B) about 50–98 weight percent of a hydrolyzed ethylene/vinyl ester copolymer which is hydrolyzed to at least about 60 percent and which, prior to hydrolysis, contains about 5–25 mole percent copolymerized vinyl ester and 75–95 mole percent copolylmerized ethylene.

DESCRIPTION OF THE INVENTION

The particular source of the hydrolyzed ethylene/vinyl ester copolymer useful in the present invention is not important. As used herein, the term "hydrolyzed copolymer" refers generally to those products wherein a portion or all of the initial vinyl ester groups in the copolymer have been converted to vinyl alcohol groups, irrespective of the particular conversion technique used, e.g., alcoholysis saponification, or hydrolysis. Consequently, the hydrolyzed copolymers useful in this invention contain, in addition to ethylene groups, vinyl alcohol groups and, optionally, unhydrolyzed vinyl ester groups. Also, the copolymers can contain minor amounts of other copolymerized monomers, such as ethylenically unsaturated carboxylic acids. In the present invention, the term "vinyl ester" refers to the vinyl esters of a wide variety of monocarboxylic acids. Among others, examples of useful vinyl esters include vinyl formate, vinyl acetate, vinyl propionate, vinyl butyrate, vinyl stearate, vinyl benzoate, vinyl cyclohexanoate, etc. Lower vinyl esters, as illustrated by the first four of the above examples, are preferred, with vinyl acetate being especially preferred. The aforementioned U.S. Pat. 2,386,347 and U.S. Pat. 3,344,129 to Bestian et al. are among the many patents and publications which describe methods of preparing useful partially or completely hydrolyzed ethylene/vinyl ester copolymers.

Both the vinyl ester content of the initial ethylene/vinyl ester copolymer and the degree to which the copolymer is hydrolyzed influence the lap-shear and peel properties of the composition of the present invention. Useful hydrolyzed copolymers are prepared from precursor ethylene/vinyl ester copolymers containing about 5–25 mole percent copolymerized vinyl ester and about 75–95 mole percent copolymerized ethylene. With respect to these precursor copolymers, it has been noted that as their degree of hydrolysis is increased, their lap-shear strength is progressively increased. On the other hand, it has also been noted that as the degree of hydrolysis of these precursor copolymers is increased, the peel strength does not progressively increase as a function of degree of hydrolysis, but rather attains a maximum at somewhere between about 15 and 70 percent hydrolysis and then falls off to considerably lower values. The degree of hydrolysis at which the maximum peel strength is attained is dependent on the particular precursor copolymer. The following table illustrates the lap-shear strength and peel strength behavior, as a function of hydrolysis, for various precursor ethylene/vinyl acetate copolymers useful in the present invention.

TABLE I

| Mole percent vinyl acetate in precursor copolymer | Melt index of precursor (¹) | percent hydrolysis | Lap-shear strength, p.s.i. (²) | Peel strength, p.l.i. (²) |
|---|---|---|---|---|
| 18 | 55 | 0 | 500 | 13 |
| 18 | 55 | 26 | 800 | 15 |
| 18 | 55 | 40 | 1,100 | 15 |
| 18 | 55 | 60 | 1,700 | 18 |
| 18 | 55 | 99 | 2,800 | 4 |
| 10 | 2 | 0 | 800 | 9 |
| 10 | 2 | 17 | 1,000 | 19 |
| 10 | 2 | 60 | 1,700 | 30 |
| 10 | 2 | 99 | 1,900 | 4 |
| 6 | 2.5 | 0 | 950 | 7 |
| 6 | 2.5 | 25 | 1,000 | 11 |
| 6 | 2.5 | 41 | 1,000 | 12 |
| 6 | 2.5 | 99 | 1,400 | 2 |
| 14 | 6 | 0 | 550 | 11 |
| 14 | 6 | 20 | 800 | 22 |
| 14 | 6 | 57 | 1,200 | 12 |
| 14 | 6 | 71 | 1,300 | 7 |
| 14 | 6 | 99 | 1,300 | 2 |

(¹) According to ASTM D-1238 (Condition E).
(²) Measured as described in Example I.

As illustrated by the above table, the degree to which a particular precursor copolymer must be hydrolyzed to give the maximum lap-shear strength does not coincide with the degree of hydrolysis necessary to give the maximum peel strength. It is with respect to this phenomenon that the present invention is concerned. Accordingly, it has been discovered that by adding isotactic polypropylene to the above precursor ethylene/vinyl ester copolymers, which have been hydrolyzed at least 60 percent, compositions are provided which have a combined high lap-shear and peel strength. Thus, it has been found that, with respect to lap-shear strength, the compositions of the present invention compare favorably with the lap-shear strength of the hydrolyzed copolymer itself. On the other hand, the peel strength of the present compositions is unexpectedly superior to that of just the hydrolyzed copolymer. In fact, for many of the present compositions, not only is the peel strength greater than that of the hydrolyzed copolymer itself, but is even greater than the maximum peel strength shown by the particular ethylene/vinyl ester copolymer itself at that degree of hydrolysis which gives rise to its maximum value. This latter phenomenon is particularly evident when the precursor ethylene/vinyl ester copolymer contains 12–25 mole percent, and preferably 16.5–19 mole percent, copolymerized vinyl ester and is subsequently hydrolyzed to at least 75 percent, and preferably substantially completely hydrolyzed, i.e., greater than 95 percent.

In the present invention, the percent of hydrolysis refers to the percent of the vinyl ester groups which have been hydrolyzed, based on the total number present initially, and can be measured as follows: Initially, a 1.00 g. sample of the hydrolyzed copolymer is dissolved in 50 ml. of xylene and, thereafter, 100 ml. of a 1:1:1 mixture of methanol-xylene-pyridine is added. Ten ml. of a 2 N solution of sodium hydroxide is then added to the solution and it is refluxed for four hours after which it is cooled and back-titrated with a 0.500 N solution of toluene sulfonic acid in pyridine using metacresol purple as an indicator. A blank sample containing no copolymer is also run in a similar fashion. Subsequently, the weight percent of vinyl ester (VE) in the hydrolyzed copolymer is calculated by using the following formula:

Percent VE = [Blank Titre (ml.) − Sample Titre (ml.)] × 4.3

Thereafter, the percent hydrolysis is determined by converting, by means of an appropriate mathematically constructed calibration curve for the particular ethylene/vinyl ester copolymer, the calculated weight percent vinyl ester to the corresponding mole percent vinyl ester in the hydrolyzed copolymer, and applying the following formula:

$$\text{Percent Hydrolysis} = 100 \left[ \frac{\text{Mole Percent VE(initial)} - \text{Mole Percent VE(inital)}}{\text{Mole Percent VE(initial)}} \right]$$

The molecular weight, as indicated by melt index, of the hydrolyzed ethylene/vinyl ester copolymer also influences the blend's adhesive properties. In this respect, very low molecular weight (high melt index) copolymers are to be avoided. Correspondingly, hydrolyzed copolymers with a melt index of less than about 180, and preferably less than about 80, are most suitable for use in the present invention. As used herein, the melt index of the hydrolyzed copolymer is measured according to ASTM D–1238 under Condition E (190° C., 2160 g.), and is reported as the flow rate in grams per ten minutes.

Isotactic polypropylene useful in the present invention is a commercially available item and the particular source from which it is obtained is not especially important. As distinguished from amorphous polypropylene, isotactic polypropylene is ordinarily higher in molecular weight and is insoluble in most common organic solvents. In general, the preparation of isotactic polypropylene is accomplished by polymerizing propylene in the presence of an inert organic liquid under a pressure of 0 to 1000 p.s.i. and at a temperature of 0° C. to 100° C. for about ½ to 50 hours. An alkyl metal catalyst system comprising a reducing agent and a reducible metal compound is ordinarily used. Due to the insolubility of the isotactic polypropylene in the organic liquid in which polymerization is accomplished, it can readily be recovered from the polymerization medium by means of filtering or centrifuging.

Ordinarily, the available isotactic polypropylenes are of high enough molecular weight to be useful in the present invention. It is desirable to use polypropylene having a molecular weight which corresponds to a melt index of less than about 500. Isotactic polypropylene having a melt index of less than about 70 and, especially about 0.4–15, is preferred. As used herein, the melt index of the polypropylene is determined according to ASTM D–1238, under Condition I (230° C., 3800 g.), and is reported as the flow rate in grams per ten minutes. Especially suitable for use in the present invention is isotactic polypropylene marketed under the "Profax" trade name.

While, as discussed above, the properties of the present composition are influenced by a variety of factors, the improved strength properties, and particularly the unexpected increase in peel strength, are also dependent on the respective amounts of isotactic polypropylene and hydrolyzed copolymer employed. In general, isotactic polypropylene must be present in an amount which raises the peel strength of the composition above that of the hydrolyzed copolymer alone; and, correspondingly, does not lead to a composition with unacceptable lap-shear strength. Accordingly, compositions of the present invention consist essentially of about 2–50 weight percent of isotactic polypropylene and about 50–98 weight percent of hydrolyzed copolymer. Preferred compositions exhibiting especially superior peel strengths contain about 15–30 weight percent isotactic polypropylene and 70–85 weight percent of the previously indicated preferred hydrolyzed copolymer.

The present composition can be simply prepared by blending together the hydrolyzed copolymer and the isotactic polypropylene by any of a variety of known blending techniques, e.g., physically blending granular materials, melt blending, etc. Most conveniently, blending is accomplished at a temperature at which the ingredients become fusible and flow easily, generally about 125–200° C., using a customary rubber mill, calender, or extruder. When using these machines, the adhesive composition is obtained in a form (bead, ribbon, film, etc.) in which it can conveniently be distributed between the surfaces to be bonded. Irrespective of the method of blending, adhesive bonding is usually accomplished at elevated temperatures of about 125–200° C., preferably 150–180° C., and under pressures of greater than about 100 p.s.i.

The present adhesive composition is useful in bonding a wide variety of materials. While particularly suitable as a structural adhesive for metal members, it can also be used in bonding other materials, such as polymeric films, metal foils, leather and cellulosic surfaces, etc. Additionally, other ingredients known in the adhesive art, such as those that modify, among others, tack, adhesion, or flexibility characteristics, can be added to the present composition in major or minor amounts. Such ingredients includes, among others, waxes, tackifying resins and rosins, plasticizers, stabilizers, etc.

The following examples illustrate the invention. Except for the specified degrees of hydrolysis, all parts and percentages are by weight unless otherwise indicated.

EXAMPLE I

A blend was prepared of 20 parts isotactic polypropylene ("Profax" 6523—melt index of 4) and 80 parts of a 30 melt index, 99 percent hydrolyzed ethylene/vinyl acetate copolymer initially having 18 mole percent vinyl acetate and 82 mole percent ethylene. The blend was obtained by milling the ingredients on a 2" x 6" rubber mill (Getty Machine & Mold, Inc.) at a temperature of 175° C. for about 15 minutes.

In order to test for lap-shear and peel strengths, 1" x 3" Alclad aluminum coupons and 8" x 8" aluminum sheets were cleaned as follows: The coupons and sheets were cleaned with acetone, degreased in Perclene® [1] perchloroethylene vapor for 5 minutes, and etched for 1 hour at 70° C. in a solution of 1 part $Na_2Cr_2O_7 \cdot 2H_2O$, 10 parts conc. $H_2SO_4$, 30 parts $H_2O$. Thereafter, they were rinsed in water and dried in an oven at 100° C. for 15 minutes.

Dry lap-shear strength was tested by placing on the lower ½" of a cleaned coupon, 0.1 gram of the Example ---
[1] Registered trademark of E. I. du Pont de Nemours and Company.

I blend and then placing another coupon on top with a ½" overlap. Five mil shims were used to obtain about a 5 mil glueline thickness. Subsequently, the coupons were bonded at 180° C. and 300 p.s.i. for 10 minutes.

Thereafter, the coupons were allowed to stand at room temperature for 24 hours. The steamed lap-shear strength value was then obtained by using an Instron tester at a crosshead speed of 0.02 inch/minute. The Example I composition exhibited a lap-shear strength of 1570 p.s.i. Also, substantially no decrease in shear strength was observed when, prior to testing, a similarly prepared coupon was steamed over boiling water for 24 hours.

Peel strength was tested by bonding together, as in the lap-shear test, 6" x 8" portions of two 8" x 8" sheets with 1.5 grams of adhesive. The edges of the sheets were trimmed and the sheets were then cut into ½" strips and the strips tested on an Instron tester using a crosshead speed of 2 inches/minute. The Example I composition exhibited an average peel strength of 23 pounds/lineal inch (p.l.i.) (six samples). Additionally, after steaming similar samples, the average peel strength was still 8 p.l.i. For comparative purposes, the dry peel strength of the hydrolyzed copolymer of Example I was tested without the polypropylene addition and found to be only about 4 p.l.i. Similarly, the peel strength of isotactic polypropylene alone is about zero.

Table II below, illustrates other compositions of the present invention. The methods of blending and testing for lap-shear and peel strengths were accomplished in manners similar to those described in Example I.

vinyl acetate copolymer contains, prior to hydrolysis, 16.5–19 mole percent copolymerized vinyl acetate.

7. The composition of claim 1 wherein the isotactic polypropylene has a melt index of less than 70 and the hydrolyzed ethylene/vinyl acetate copolymer has a melt index of less than 180.

8. The composition of claim 7 wherein the vinyl ester is vinyl acetate and the ethylene/vinyl acetate copolymer is hydrolyzed to at least about 75 percent.

9. The composition of claim 8 wherein the ethylene/vinyl acetate copolymer contains, prior to hydrolysis, 12–25 mole percent copolymerized vinyl acetate.

10. The composition of claim 9 wherein the isotactic polypropylene is present in an amount of about 15–30 weight percent and the hydrolyzed copolymer in 70–85 percent.

11. The composition of claim 10 wherein the ethylene/vinyl acetate copolymer is substantially completely hydrolyzed.

12. The composition of claim 11 wherein the isotactic polypropylene has a melt index of 0.4–15 and the hydrolyzed ethylene/vinyl acetate copolymer has a melt index of less than 80.

13. The composition of claim 12 wherein the ethylene/vinyl acetate copolymer contains, prior to hydrolysis, 16.5–19 mole percent copolymerized vinyl acetate.

14. An article comprising at least two surfaces adhesively bonded together with the composition of claim 1.

15. The article of claim 14 wherein the two surfaces adhesively bonded are metal.

TABLE II

| Example | Percent VAc[1] | Percent Hyd.[2] | Melt Index Hyd. Co.[3] | Melt Index P.P.[4] | Percent Hyd. Co. in blend | Lap-shear (p.s.i.) Dry | Lap-shear (p.s.i.) Steamed | Peel (p.l.i.) Dry | Peel (p.l.i.) Steamed | Hyd. Co. alone, peel (p.l.i.) Dry | Hyd. Co. alone, peel (p.l.i.) Steamed |
|---|---|---|---|---|---|---|---|---|---|---|---|
| II | 18 | 99 | 30 | 4 | 50 | 1,165 | 855 | 11 | 7 | 4 | 8 |
| III | 18 | 99 | 30 | 4 | 57 | 1,010 | 445 | 12 | 7 | 4 | 8 |
| IV | 18 | 99 | 30 | 4 | 67 | 1,735 | 1,035 | 18 | 8 | 4 | 8 |
| V | 18 | 99 | 30 | 4 | 74 | 1,770 | 1,610 | 22 | 8 | 4 | 8 |
| VI | 18 | 99 | 30 | 4 | 87 | 2,399 | 2,035 | 13 | 20 | 4 | 8 |
| VII | 18 | 99 | 30 | 4 | 91 | 2,180 | 2,035 | 12 | 25 | 4 | 8 |
| VIII | 18 | 99 | 30 | 4 | 95 | 2,910 | 2,270 | 14 | 18 | 4 | 8 |
| IX | 18 | 99 | 140 | 4 | 90 | (5) | (5) | 10 | (5) | 2 | (5) |
| X | 18 | 99 | 30 | 6 | 80 | (5) | (5) | 29 | (5) | 4 | 8 |
| XI | 18 | 99 | 30 | 15 | 80 | (5) | (5) | 29 | (5) | 4 | 8 |
| XII | 6 | 99 | 2 | 4 | 50 | 1,235 | 1,160 | 8 | 4 | 4 | (5) |
| XIII | 6 | 99 | 2 | 4 | 80 | 1,440 | 1,230 | 6 | 3 | 4 | (5) |

[1] Mole percent vinyl acetate in initial copolymer.
[2] Percent hydrolysis of initial copolymer.
[3] Hydrolyzed copolymer.
[4] Isotactic polypropylene.
[5] Not measured.

What is claimed is:

1. A composition consisting essentially of (A) 2–50 weight percent isotactic polypropylene and (B) 50–98 weight percent of at least a 60 percent hydrolyzed ethylene/vinyl ester copolymer containing, prior to hydrolysis, 5–25 mole percent copolymerized vinyl ester and 75–95 mole percent copolymerized ethylene.

2. The composition of claim 1 wherein the vinyl ester is vinyl acetate.

3. The composition of claim 2 wherein the ethylene/vinyl acetate copolymer is hydrolyzed to at least about 75 percent.

4. The composition of claim 3 wherein the ethylene/vinyl acetate copolymer contains, prior to hydrolysis, 12–25 mole percent copolymerized vinyl acetate.

5. The composition of claim 4 wherein the ethylene/vinyl acetate copolymer is substantially completely hydrolyzed.

6. The composition of claim 5 wherein the ethylene/

16. An article comprising at least two metal surfaces adhesively bonded together with the composition of claim 13.

References Cited

UNITED STATES PATENTS 3,248,359  4/1966  Maloney _____ 260—41
3,226,455  12/1965  Matsubayashi et al. __ 260—897
2,386,347  2/1945  Roland _____ 260—86

FOREIGN PATENTS 582,093  11/1946  Great Britain.

MURRAY TILLMAN, Primary Examiner

C. J. SECCURO, Assistant Examiner

U.S. Cl. X.R.

156—334; 161—216, 249